United States Patent
Chung et al.

(10) Patent No.: US 7,747,766 B2
(45) Date of Patent: Jun. 29, 2010

(54) SYSTEM AND METHOD FOR RECOGNIZING OFFLOADED PACKETS

(75) Inventors: Shen-Ming Chung, Hsinchu (TW); Jun-Yao Wang, Hsinchu (TW); Hsiao-Hui Lee, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 615 days.

(21) Appl. No.: 11/645,572

(22) Filed: Dec. 27, 2006

(65) Prior Publication Data

US 2007/0283041 A1    Dec. 6, 2007

(30) Foreign Application Priority Data

Jun. 1, 2006    (TW) .............................. 95119412 A

(51) Int. Cl.
  *G06F 15/16*    (2006.01)
(52) U.S. Cl. ..................... 709/230; 709/225; 709/232
(58) Field of Classification Search ................ 709/225, 709/230, 232
  See application file for complete search history.

(56) References Cited

U.S. PATENT DOCUMENTS

| | | | |
|---|---|---|---|
| 6,421,730 B1 * | 7/2002 | Narad et al. ................ 709/236 |
| 6,980,551 B2 * | 12/2005 | Pfister et al. ................ 709/227 |
| 7,471,689 B1 * | 12/2008 | Tripathi et al. ......... 370/395.42 |
| 7,475,167 B2 * | 1/2009 | Wunderlich et al. ......... 709/227 |
| 2004/0062245 A1 | 4/2004 | Sharp et al. |
| 2004/0111523 A1 | 6/2004 | Hall et al. |
| 2004/0117496 A1 * | 6/2004 | Mittal et al. ................ 709/230 |
| 2004/0190516 A1 * | 9/2004 | Williams .................... 370/392 |
| 2005/0122986 A1 | 6/2005 | Starr et al. |
| 2005/0246450 A1 * | 11/2005 | Enko et al. .................. 709/230 |
| 2006/0168281 A1 * | 7/2006 | Starr et al. .................. 709/230 |
| 2006/0174324 A1 * | 8/2006 | Zur et al. ....................... 726/3 |
| 2006/0235977 A1 * | 10/2006 | Wunderlich et al. ......... 709/227 |
| 2006/0274788 A1 * | 12/2006 | Pong .......................... 370/469 |

FOREIGN PATENT DOCUMENTS

| TW | 200522612 A | 7/2005 |
|---|---|---|
| TW | 200531482 A | 9/2005 |

* cited by examiner

*Primary Examiner*—Phuoc Nguyen
(74) *Attorney, Agent, or Firm*—Volentine & Whitt, P.L.L.C.

(57) ABSTRACT

A method and system for recognizing offloaded packets, wherein a common attribute of connection identifications among a plurality of offloaded connections is first calculated. Then, a connection identification of a packet is recognized to determine whether the connection identification of the packet has the common attribute so as to determine whether the packet is a non-offloaded packet. Therefore, the non-offloaded packet can be promptly recognized to greatly lower the recognition workload of an embedded processor, to improve the efficiency of executing a partial offloaded process by the embedded processor and to decrease the operation delay of the non-offloaded packet in a protocol offload processing system.

8 Claims, 7 Drawing Sheets

SYSTEM AND METHOD FOR RECOGNIZING OFFLOADED PACKETS

BACKGROUND OF THE INVENTION

1. Field of the Invention

The present invention relates to a processing system and method for protocol offload. More particularly, the present invention relates to a system and method for recognizing offloaded packets.

2. Description of the Related Art

Referring to FIG. 1, it shows a conventional protocol offload processing system 10 with an embedded CPU. The conventional protocol offload processing system 10 comprises a CPU 11, a hardware acceleration logic 12, a packet buffer 13 and a memory 14. The hardware acceleration logic 12 is bridged to a media access control module of a network 15, a host interface of a host 16 and an embedded CPU interface. When receiving a packet, the hardware acceleration logic 12 first temporarily stores the packet in the packet buffer 13 and processes the packet based on the packet recognition result. If the packet is recognized as a non-offloaded packet, the packet is transmitted to the host 16 to proceed subsequent processes performed by conventional protocol software. If the packet is recognized as an offloaded packet, after the protocol offload processing system 10 finishes the protocol process, the payload of the packet is transmitted to the host and contacts the original socket interface through an exclusive interface, such that an upper layer application program achieves a correct data stream.

A common packet can be recognized by a connection identification (CID) of each protocol. In an embodiment of the TCP/IP protocol, the CID is constituted by four sorts of connection information, namely, a source IP address, a source TCP port, a destination IP address and a destination TCP port.

The CID of each protocol is usually too redundant, for example, in an embodiment of the TCP/IP protocol, the total length of the CID is 96 bits. As for the protocol offload processing system supporting the offload of n connections, the cost is high if a piece of hardware is directly used to compare n groups of 96 bits. Therefore, generally, a specific hash function is utilized to map the CID of a packet from the 96-bit space to a smaller space, and then determine whether the packet is an off-loaded one according to a hash table corresponding to the smaller space. As the connection protocol information hit each other when being mapped from a large space to a smaller space, each entry of the hash table usually corresponds to a linked-list to connect the hit connection protocol information.

In a word, during a common recognition process, an entry corresponding to the CID in the hash table is first calculated by the hash function. Then, the CID of each packet is compared with the CID of the offloaded connection one by one in the linked-list corresponding to the entry. If there is any CID of the offloaded connections in the linked-list equal to that of a received packet, the received packet is an offloaded packet; conversely, if there is no CID of the offloaded connections in the linked-list equal to that of the received packet, the received packet is a non-offloaded packet.

During a common recognition process, the recognition result directly determines whether the received packet is an offloaded packet, and the process that can directly determine whether the packet is an offloaded one is referred to as positive recognition. In positive recognition, the calculation of the hash function is suitable to be accelerated by hardware, and the search of the linked-list corresponding to the hash table is suitable to be executed by an embedded CPU. In order to reduce the time for searching the linked-list, the selection of the hash function becomes very important. However, the effect of the hash function depends on the region of the connections. For example, in an embodiment of the TCP/IP, different kinds of IP addresses are allocated to different regions, or called domains. Therefore, if the hash function is used for widely distributed domains, for example, in a WAN, it is difficult to forecast how the hash function will improve the recognition speed of a packet.

Therefore, to solve the above problems, it is necessary to provide system and method for recognizing offloaded packets.

SUMMARY OF THE INVENTION

According to the present invention, the method for recognizing offloaded packets comprises: calculating a common attribute of CIDs among a plurality of offloaded connections; recognizing whether the CID of a packet has the common attribute, so as to determine whether the packet is a non-offloaded packet; and recognizing whether the packet is an offloaded packet if the CID of the packet has the common attribute.

According to the present invention, the system for recognizing offloaded packets is used in a protocol offload processing system with an embedded processor. The system for recognizing offloaded packets comprises a common attribute calculating device, a non-offloaded packet recognition device and an offloaded packet recognition device. The common attribute calculating device is used to calculate a common attribute of CIDs among a plurality of offloaded connections. The non-offloaded packet recognition device is used to recognize whether the CID of a packet has the common attribute, so as to determine whether the packet is a non-offloaded packet. The offloaded packet recognition device is used to recognize whether the packet is an offloaded packet if the CID of the packet has the common attribute.

The system and method for recognizing offloaded packets provided by the present invention can promptly recognize the non-offloaded packet to greatly lower the recognition workload of the embedded processor, to improve the efficiency of executing a partial offloaded process by the embedded processor, and to decrease the operation delay of the non-offloaded packet in the protocol offload processing system.

DETAILED DESCRIPTION OF THE INVENTION

Figure 1:
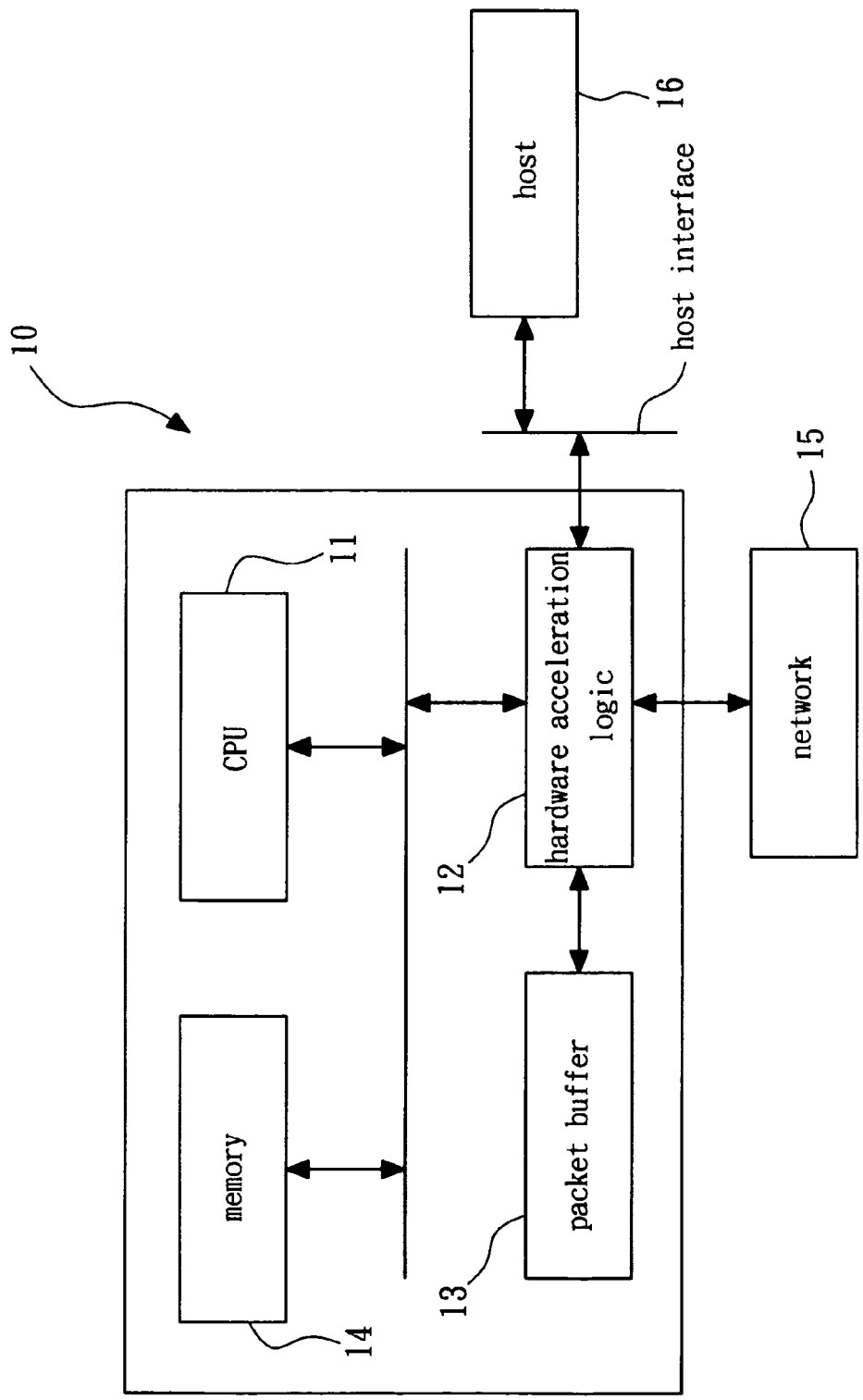
FIG. 1 is a schematic view of a conventional protocol offload processing system with an embedded CPU.
Figure 2:
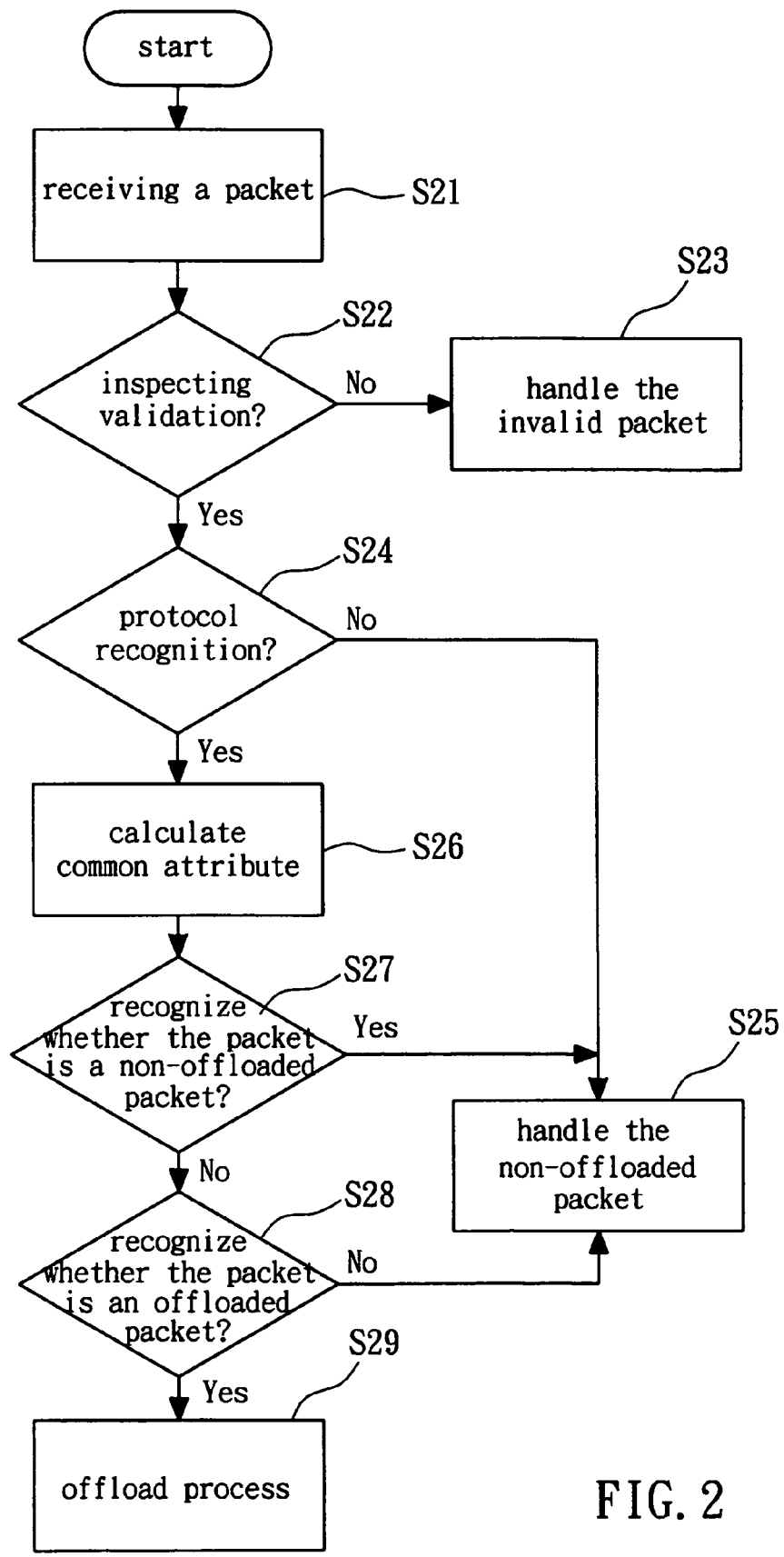
FIG. 2 is a flow chart of the method for recognizing offloaded packets according to the present invention.

Referring to FIG. 2, it is a flow chart of the method for recognizing offloaded packets according to the present invention. As shown in Step S21, a packet is received from a network. Firstly, the packet undergoes a validation inspection, such as the checksum error detection of TCP/IP, as shown in Step S22. If the packet is an invalid packet (for example, the checksum of TCP/IP is incorrect), the invalid packet is handled by being directly discarded or transmitted to a host accompanied with a warning message, as shown in Step S23.

If the packet passes the validation inspection, the protocol recognition is then performed to determine whether the protocol of the packet is designed to be offloaded by the protocol offload processing system. For example, in an embodiment of the TCP/IP, the valid packet is inspected to determine whether it is a TCP/IP packet, as shown in Step S24. If the valid packet is not a TCP/IP packet, the packet is a non-offloaded packet and can be directly transmitted to the host to undergo the subsequent conventional protocol process, as shown in Step S25.

If the packet is valid and belongs to the offloaded protocol, the packet is first checked to determine whether it is a non-offload packet, so as to filter off the non-offloaded packet, thus preventing the non-offloaded packet from undergoing the positive recognition performed by the embedded CPU in the prior art. Referring to Step S26, a common attribute of CIDs among a plurality of offloaded connections is calculated. The common attribute can be calculated in advance via Equation (1A):

$$CID_{attribute} = CID_0 | CID_1 | \ldots | CID_{n-1} \quad (1A)$$

$CID_{attribute}$ is the common attribute, $CID_0$-$CID_{n-1}$ are CIDs of n offloaded connections and | is a bit-wise OR operation. That is, the common attribute is calculated through a bit-wise OR operation on the CIDs of the offloaded connections. The common attribute $CID_{attribute}$ in Equation (1A) determines the positions at which the binary values of $CID_0$-$CID_{n-1}$ are all logic 0.

Referring to Step S27, the CID of the packet is recognized to determine whether it has the common attribute, so as to determine whether the packet is a non-offloaded packet. The common attribute $CID_{attribute}$ in Equation (1A) determines the positions at which the binary values of $CID_0$-$CID_{n-1}$ are all logic 0. Thus, if the binary values of the CIDs of the received packet have more than one value that is not logic 0 at the positions of logic 0 of the common attribute, the received packet is determined to be a non-offloaded packet. Therefore, the received packet can be checked to determine whether it is a non-offloaded packet via Equation (1B):

$$(CID_{rcvpkt} \& \sim CID_{attribute}) != 0 \quad (1B)$$

$CID_{attribute}$ is the common attribute, $CID_{rcvpkt}$ is the CID of a received packet, & is a bit-wise AND operation and ~ is a bit-wise NOT operation. When Equation (1B) is satisfied, the received packet is a non-offloaded packet.

Therefore, the step of recognizing whether the packet is a non-offloaded packet comprises: performing a bit-wise NOT operation on the common attribute; performing a bit-wise AND operation on the CID of the packet and the inverted common attribute, so as to calculate a negative identification code; and inspecting the negative identification code to determine whether it has at least one bit that is not logic 0, wherein if the negative identification code has at least one bit that is not logic 0, the packet is a non-offloaded packet.

The aforementioned Equations (1A) and (1B) combine to determine whether a packet is a non-offloaded packet. Besides that, the common attribute can also be calculated in advance through Equation 2(A), and the packet is recognized through Equation (2B).

$$CID_{attribute} = CID_0 \& CID_1 \& \ldots \& CID_{n-1} \quad (2A)$$

$CID_{attribute}$ is the common attribute, $CID_0$-$CID_{n-1}$ are CIDs of n offloaded connections and & is a bit-wise AND operation. That is, the common attribute is calculated through a bit-wise AND operation on the CIDs of the offloaded connections.

The common attribute $CID_{attribute}$ in Equation (2A) determines the positions at which the binary value of $CID_0$-$CID_{n-1}$ are all logic 1. Therefore, if the binary values of the CIDs of the received packet have more than one value that is not logic 1 at the position of logic 1 of the common attribute, the received packet is determined to be a non-offload packet. The received packet is checked to determine whether it is a non-offloaded packet via Equation (2B).

$$\sim(CID_{rcvpkt} | \sim CID_{attribute}) != 0 \quad (2B)$$

$CID_{attribute}$ is the common attribute, $CID_{rcvpkt}$ is the CID of a received packet, | is a bit-wise OR operation and ~ is a bit-wise NOT operation. When Formula (2B) is satisfied, the received packet is a non-offloaded packet.

Therefore, according to Equation (2B), the step of recognizing whether the packet is a non-offloaded packet comprises: performing a bit-wise NOT operation on the common attribute; performing a bit-wise OR operation on the CID of the packet and the inverted common attribute, so as to calculate a negative identification code; performing a bit-wise NOT operation on the negative identification code; and inspecting the inverted negative identification code to determine whether it has at least one bit that is not logic 0, wherein if the inverted negative identification code has at least one bit that is not logic 0, the packet is a non-offloaded packet.

The expressions on the left of the sign of inequality of the Equations (1A), (1B), (2A) and (2B) are referred to as Boolean algebra expressions, wherein the Boolean algebra expressions have equivalents. Therefore, the aforementioned Equations (1A), (1B), (2A), (2B) and the descriptions thereof are only means for implementation and are not intended to limit the claims of the present invention.

In Steps S26 and S27, since the recognition results can only determine whether the packet is a non-offloaded packet but cannot determine whether the packet is an offloaded packet, the recognition is referred to as negative recognition herein.

The non-offloaded packet filtered off by the negative recognition is directly transmitted to the host to proceed the subsequent conventional protocol process, as shown in Step S25. If the CID of the packet has the common attribute, the packet is further recognized to determine whether it is an offloaded packet, as shown in Step S28.

That is, for the packet passing through the negative recognition, if necessary, the parameter, such as a hash index, needed in the positive recognition is calculated through the positive recognition accelerating circuit. After the desired parameter is obtained, the embedded CPU performs positive recognition. The positive recognition could be any method that can recognize packets of offloaded connections, such as content addressable memory (CAM), linear search, hash function, hash table or other feasible methods.

Figure 3:
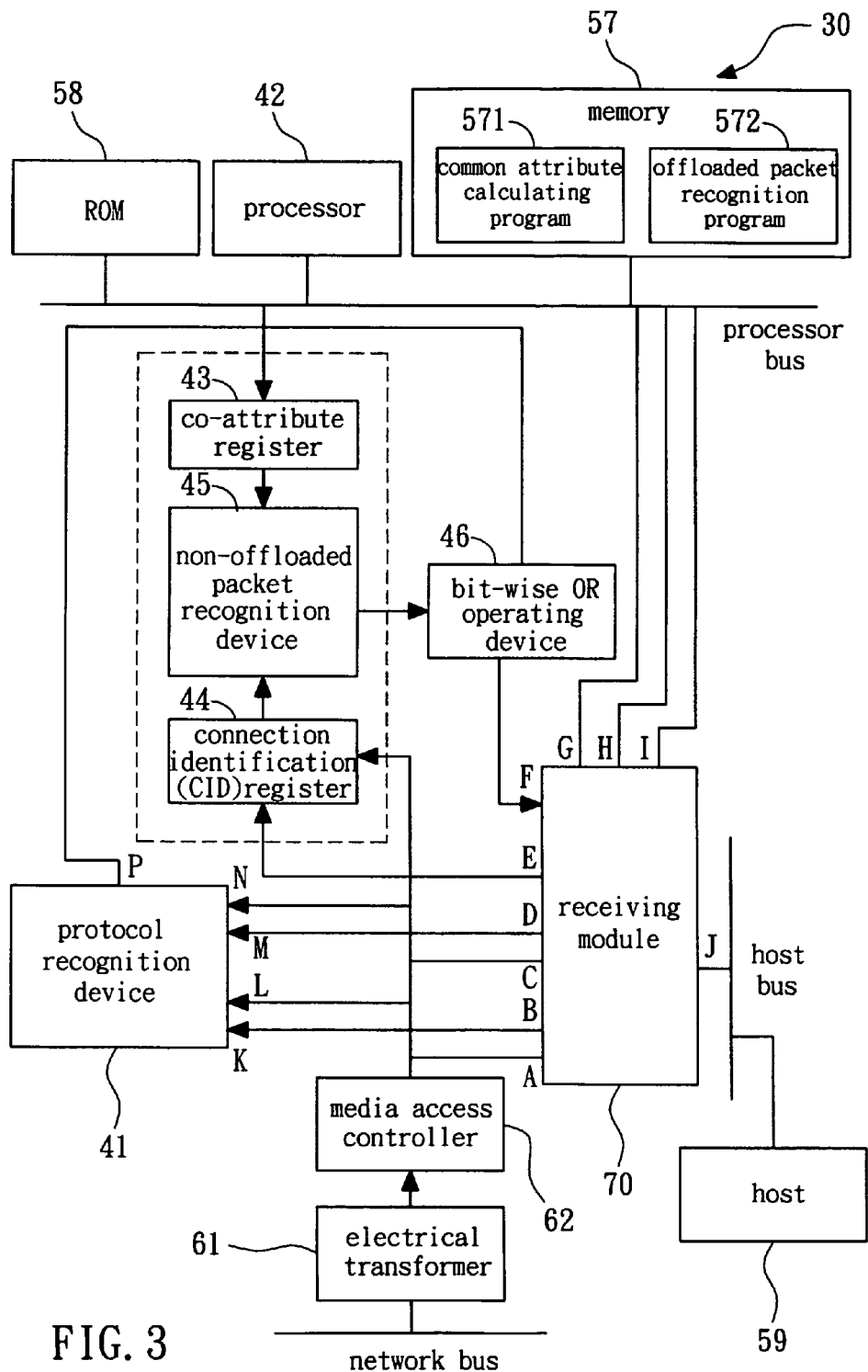
FIG. 3 is a schematic view of the protocol offload processing system according to the present invention.
Figure 7:
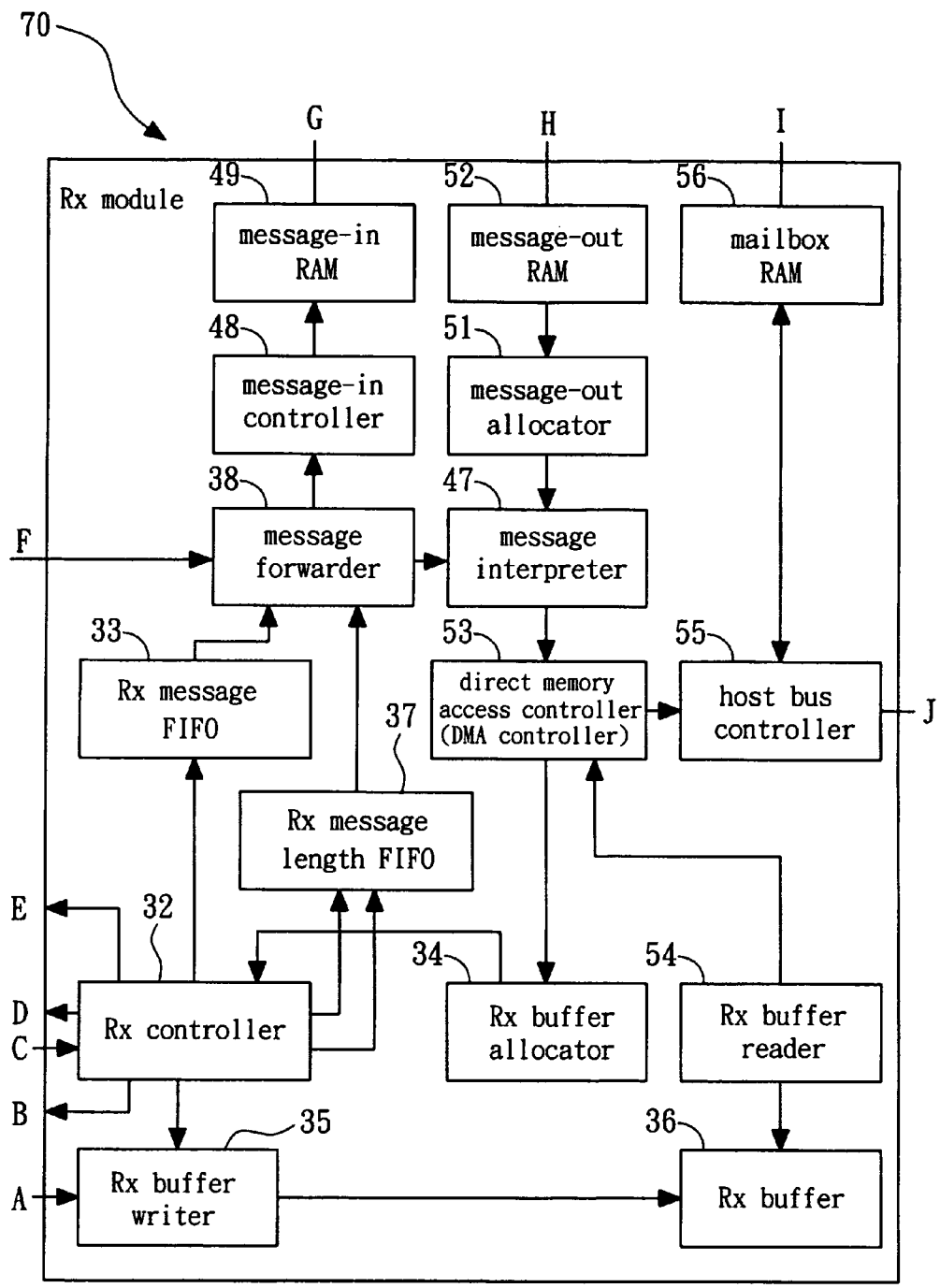
FIG. 7 is a schematic view of the receiving module according to the present invention.

Referring to FIG. 3, it is a schematic view of the protocol offload processing system with an embedded processor according to the present invention. The protocol offload processing system 30 in the embodiment of the present invention is a TCP/IP protocol, connected to a host through a host bus, and connected to a network bus on the other end. After a packet in the network is received by an electrical transformer 61 and a media access controller 62, the content of the packet is monitored by an Rx controller 32 in a receiving module 70 at a rate of 32 bits per clock, as shown in FIG. 7.

When a packet is received, the Rx controller 32 reads the content of the packet, collates the information in the packet header and then places the information into the Rx message FIFO 33. The Rx controller requires an unused space address from an Rx buffer allocator 34 for each packet and places the address into the Rx message FIFO 33. The Rx controller 32 provides the address to an Rx buffer writer 35 to temporarily store the packet in a designated space. After the whole Rx message is finished, the Rx controller 32 places the length of the Rx message into an Rx message length FIFO, such that a subsequent message forwarder 38 knows the length of each message in order to facilitate carrying out correct reading.

The Rx controller 32 further comprises a validation inspection device (not shown) for inspecting the validation of the packet. Referring to FIGS. 3 and 7, the Rx controller 32 controls a protocol recognition device 41 while monitoring a packet, and the protocol recognition device 41 is used to determine whether the protocol of the packet is the same as the protocol of the protocol offload processing system 30. The protocol of the protocol offload processing system 30 in the present embodiment is a TCP/IP protocol.

Figure 4:
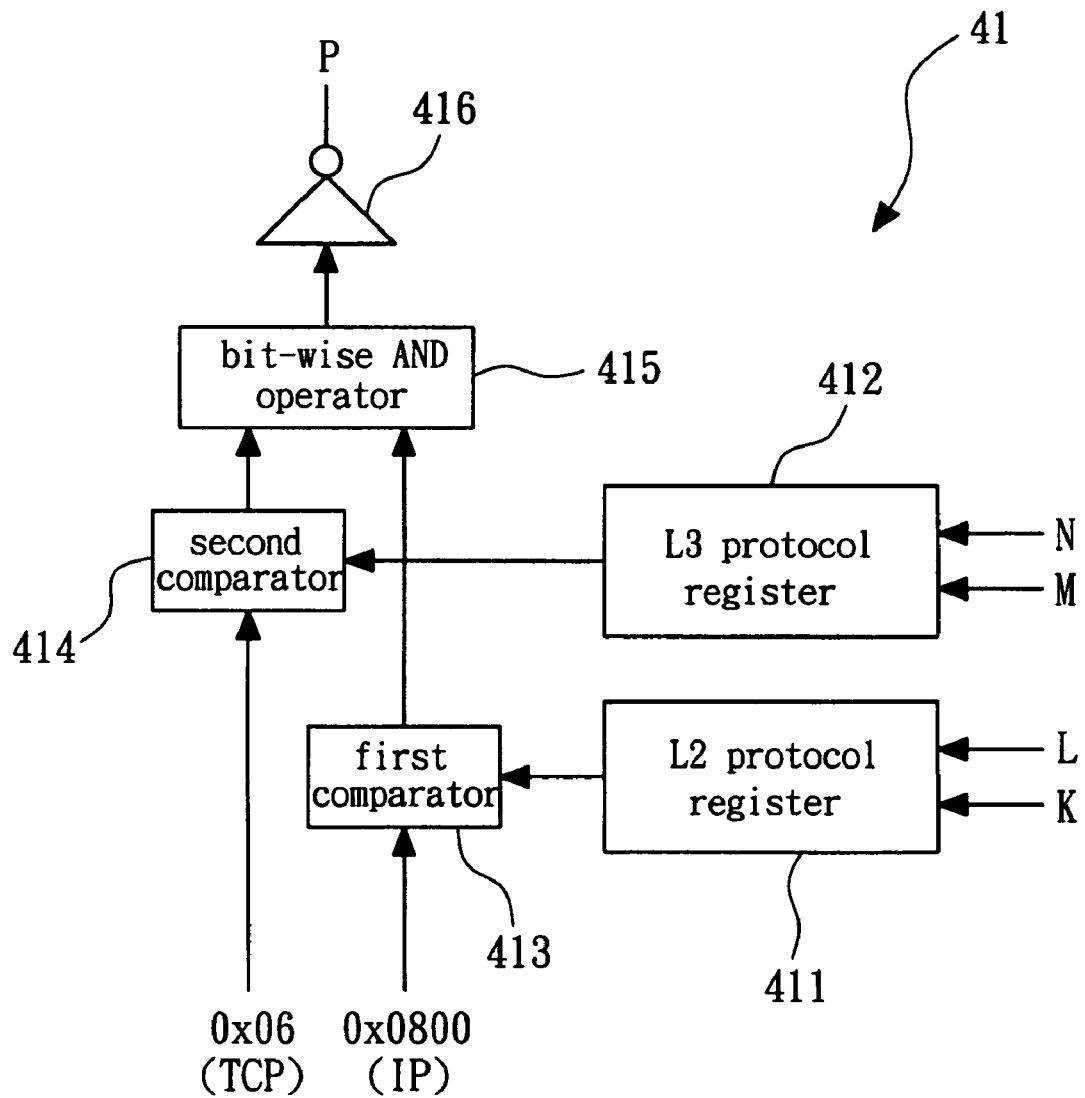
FIG. 4 is a schematic view of the protocol recognition device according to the present invention.

Referring to FIG. 4, it is a schematic view of the protocol recognition device 41. The protocol recognition device 41 comprises an L2 protocol register 411, an L3 protocol register 412, a first comparator 413, a second comparator 414, a bit-wise AND operator 415 and an inverter 416. The L2 protocol register 411 and the L3 protocol register 412 are used to temporarily store the layer-2 protocol ID and layer-3 protocol ID in the packet header respectively. As for a TCP/IP protocol of the present embodiment, the layer-2 protocol ID and the layer-3 protocol ID are respectively 0x0800 and 0x06. After being compared with 0x0800 and 0x06 by the first comparator 413 and the second comparator 414, and then calculated by the bit-wise AND operator 415 and the inverter 416, if it is determined that the received packet is not a TCP/IP packet, the output (P node) of the inverter 416 is logic 1.

Referring to FIGS. 3 and 7, when a updating occurs among the offloaded connections, for example, the host 59 offloading a new connection or an offloaded connection is flushed back to host 59, the host 59 informs the processor 42 of the protocol offload processing system 30 by using a mailbox RAM 56 as a medium. A common attribute calculating device of the present invention is used to calculate a common attribute of CIDs among a plurality of offloaded connections. In the present embodiment, the common attribute calculating device is a common attribute calculating program 571 stored in the memory 57, and, however, the common attribute calculating device of the present invention can also be realized by means of hardware.

The common attribute calculating program 571 calculates a 96-bit common attribute by using Equation (1A) or (2A). That is, the common attribute calculating program 571 calculates the common attribute by performing a bit-wise OR (Equation 1A) operation or a bit-wise AND (Equation 2A) operation among a plurality of offloaded connections. Besides, the common attribute calculating program 571 can also use other operations which can calculates a common attributes from CIDs of a plurality of offloaded connections.

Additionally, if the processor 42 or the host 59 intends to perform the offload connection updating, the common attribute calculating program 571 can also be used to update the common attribute. After calculation, the common attribute is written into a co-attribute register 43.

The CID of the received packet is stored in a CID register 44. The common attribute and the CID of the received packet are transmitted to a non-offloaded packet recognition device 45, which is used to recognize whether the received packet has the common attribute, so as to determine whether the packet is a non-offloaded packet.

Figure 5:
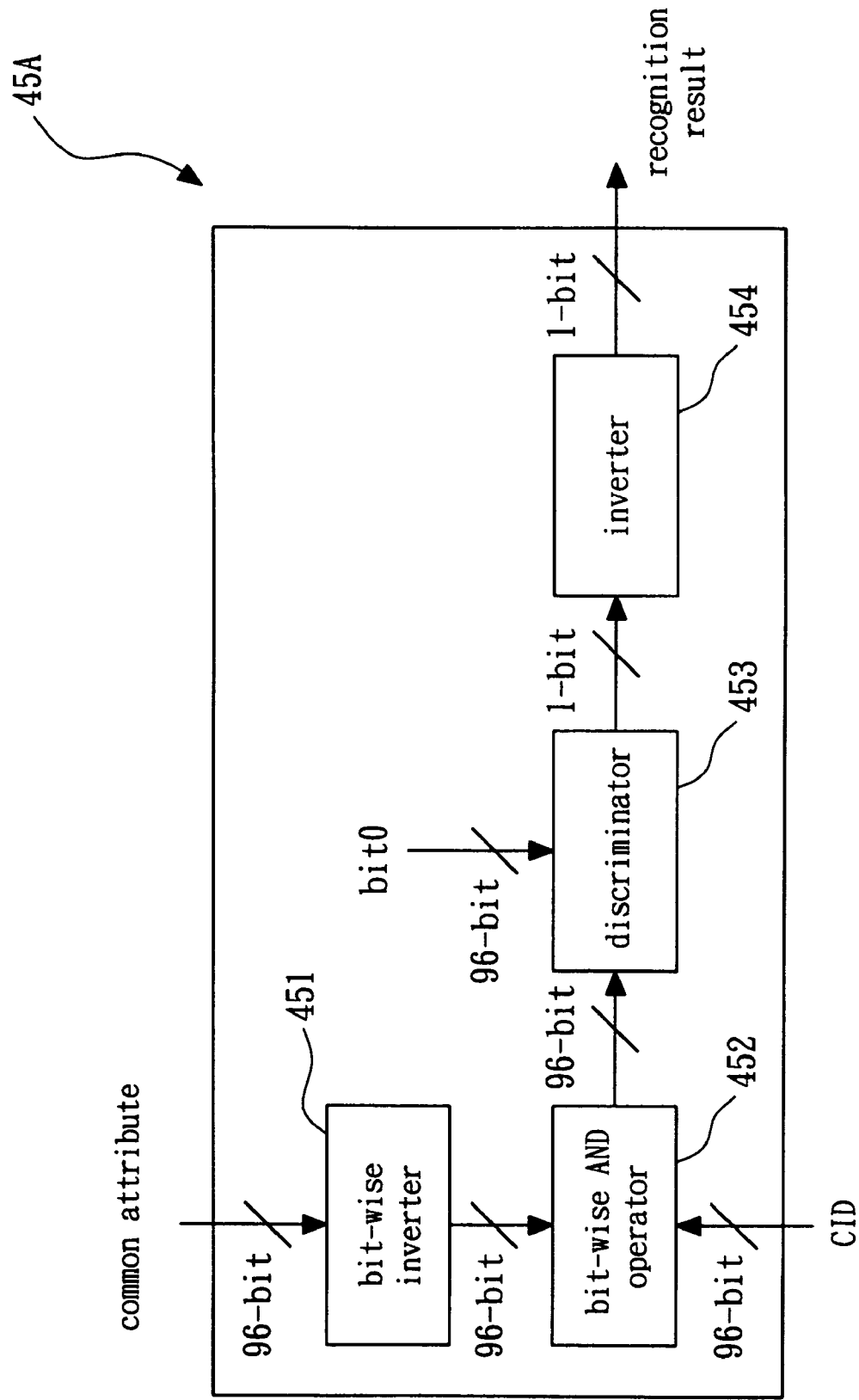
FIG. 5 is a schematic view of the first implementation aspect of the non-offloaded packet recognition device according to the present invention.

Referring to FIG. 5, it is a schematic view of the first implementation aspect of the non-offloaded packet recognition device according to the present invention. The non-offloaded packet recognition device 45A in the first implementation aspect is a circuit designed according to Formula (1B). The non-offloaded packet recognition device 45A comprises a bit-wise inverter 451, a bit-wise AND operator 452, a discriminator 453 and an inverter 454. The bit-wise inverter 451 is used to perform a bit-wise NOT operation on the common attribute. The bit-wise AND operator 452 is used to perform a bit-wise AND operation on the CID of the packet and the inverted common attribute, so as to calculate a negative identification code. The discriminator 453 is used to compare the negative identification code with a 96-bit logic 0 and inspect whether the negative identification code has at least one bit that is not logic 0. If the negative identification code has at least one bit that is not logic 0, the packet is a non-offloaded packet. The inverter 454 is used to invert the output of the discriminator 453. If the packet is a non-offloaded packet, the recognition result is logic 1.

Figure 6:
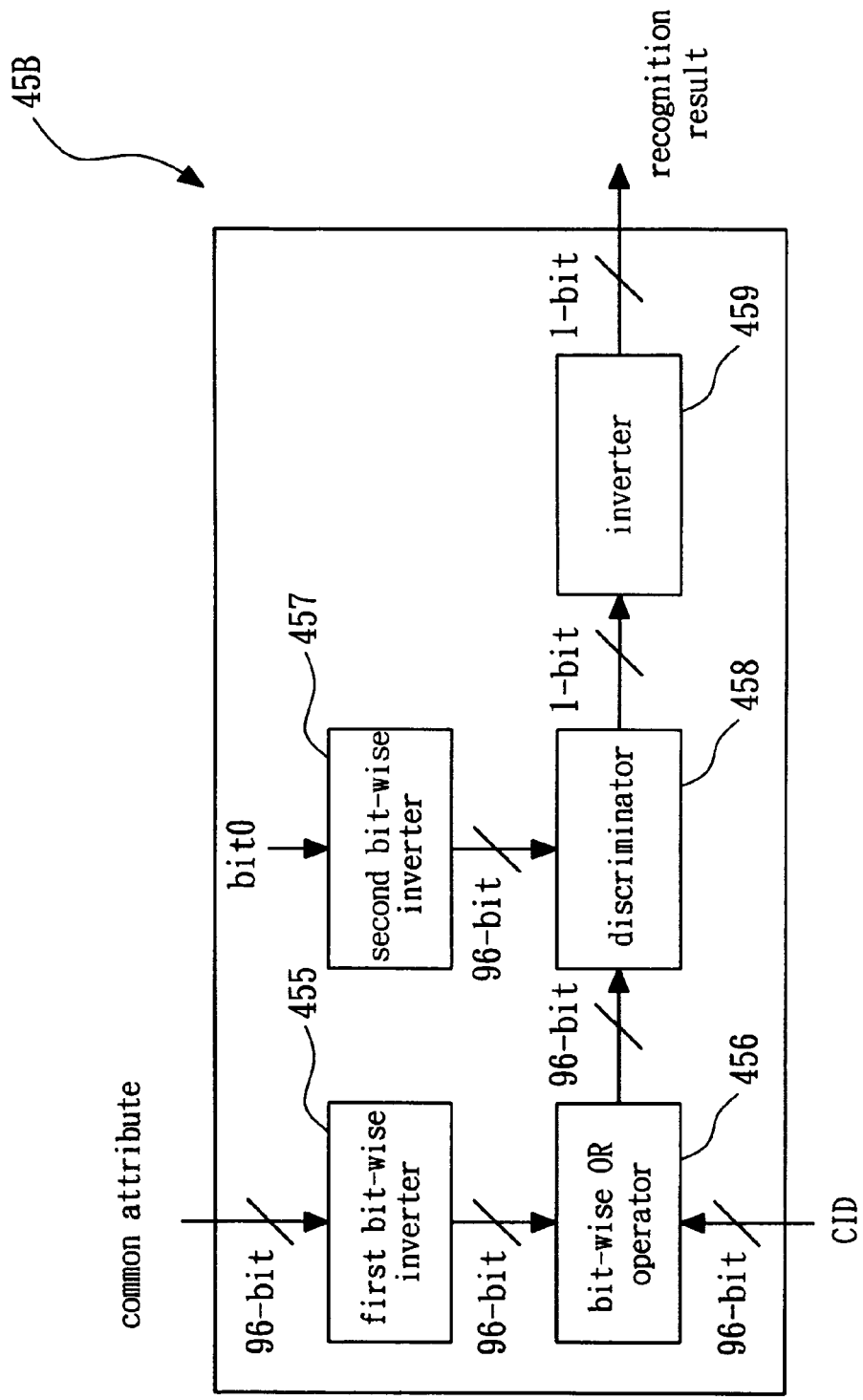
FIG. 6 is a schematic view of the second implementation aspect of the non-offloaded packet recognition device according to the present invention.

Referring to FIG. 6, it is a schematic block view of the second implementation aspect of the non-offloaded packet recognition device according to the present invention. The non-offloaded packet recognition device 45B in the second implementation aspect is a circuit designed according to Equation (2B). The non-offloaded packet recognition device 45B comprises a first bit-wise inverter 455, a bit-wise OR operator 456, a second bit-wise inverter 457, a discriminator 458 and an inverter 459. The first bit-wise inverter 455 is used to perform a bit-wise NOT operation on the common attribute. The bit-wise OR operator 456 is used to perform a bit-wise OR operation on the CID of the packet and the inverted common attribute, so as to calculate a negative identification code. The second bit-wise inverter 457 is used to perform a bit-wise NOT operation on a 96-bit logic 0 to cause it to become a 96-bit logic 1. The discriminator 458 is used to compare the negative identification code with the 96-bit logic 1 and inspect whether the negative identification has at least one bit that is not logic 1. If the negative identification code has at least one bit that is not logic 1, the packet is a non-offloaded packet. The inverter 459 is used to invert the output of the discriminator 458. If the packet is a non-offloaded packet, the recognition result is logic 1.

Referring to FIGS. 3 and 7, the recognition result and the output node P of the protocol recognition device 41 are transmitted to a bit-wise OR operating device 46. When the operation result of the bit-wise OR operating device 46 is logic 1, the received packet has been recognized as a non-offloaded packet. Therefore, the message forwarder 38 reads the message from the Rx message FIFO 33 and directly transmits the message to a message interpreter 47. If the operation result of the bit-wise OR operating device 46 is logic 0, the received packet is a TCP/IP packet, but whether the received packet is an offloaded packet cannot be determined. Therefore, the message forwarder 38 reads the message from the Rx message FIFO 33 and places the message into a message-in RAM 49 to be read by the processor 42 through a message-in controller 48. The subsequent positive recognition and protocol process are performed by an offloaded packet recognition device of the present invention. In the present embodiment, the offloaded packet recognition device is an offloaded packet recognition program 572 stored in the memory 57. The offloaded packet recognition device can also be realized by means of hardware.

The message interpreter 47 acquires the message from two sources, wherein the first source is the message forwarder 38 and the second source is a message-out dispatcher 51. The message from the message forwarder 38 represents a non-offloaded packet. The message interpreter 47 reads and converts the message into control signals. A direct memory access controller (DMA controller) 53 is required to replicate the packet at the space address recorded in the message to the space specially for temporarily storing all non-offloaded packets in the memory of the host 59 through a host bus controller. After finishing the replication, the DMA controller 53 returns the address for temporarily storing the packet in the Rx buffer 36 to the Rx buffer allocator 34, so as to reuse the memory space corresponding to the address.

The message-out dispatcher 51 transmits the message written into a message-out RAM 52 by the processor 42 to the message interpreter 47. There are two kinds of messages from the message-out dispatcher 51. One is a message belonging to a non-offloaded packet after being recognized by the processor 42, wherein the processing mode of the message is the same as that of the message transmitted by the message forwarder 38.

The other is a message belonging to an offloaded packet after being recognized by a positive recognition performed by the offloaded packet recognizing program 572. At this moment, the message comprises at least four sorts of information, namely, the address where the packet is temporarily stored in the Rx buffer 36, the starting point of the replication of the payload of the packet, the replication length and the destination address of the memory of the host. The message interpreter 47 utilizes the at least four sorts of information to request the DMA controller 53 to replicate the payload from the Rx buffer 36 to the memory of the host 59. After finishing the replication, the DMA controller 53 returns the address for temporarily storing the packet in the Rx buffer 36 to the Rx buffer allocator 34.

As the protocol offload processing system 30 with the embedded processor 42 may receives both the offloaded packet and the non-offloaded packet, whether the two packets can be rapidly distinguished not only directly affects the protocol processing efficiency of the embedded processor 42, but also affects the operation delay of the non-offloaded packet.

The method and system for recognizing offloaded packets according to the present invention can effectively improve the efficiency of executing a partial offloading process by the embedded processor and decrease the operation delay of the non-offloaded packet in the protocol offload processing system. Therefore, the method and system for recognizing offloaded packets are quite suitable to be used in a partial protocol offload processing engine with an embedded CPU.

The above common attribute calculating device, the non-offloaded packet recognition device 45 and the offloaded packet recognition device can compose a system for recognizing offloaded packets to execute the recognition of the packets.

In addition, the method and device for calculating the common attribute and the method and device for recognizing the non-offloaded packet are not limited to Formulas (1A), (1B), (2A), (2B) and their Boolean algebra equivalent expressions.

While an embodiment of the present invention has been illustrated and described, various modifications and improvements can be made by those skilled in the art. The embodiment of the present invention is therefore described in an illustrative, but not restrictive, sense. It is intended that the present invention may not be limited to the particular forms as illustrated, and that all modifications which maintain the spirit and scope of the present invention are within the scope as defined in the appended claims.

What is claimed is:

1. A method for recognizing offloaded packets in a protocol offload processing system, the method comprising:
   calculating a common attribute of connection identifications (CIDs) among a plurality of offloaded connections using a common attribute calculating device;
   recognizing the CID of a packet to determine whether the CID has the common attribute, so as to determine whether the packet is a non-offloaded packet, using a first recognition device; and
   recognizing whether the packet is an offloaded packet if the CID of the packet has the common attribute, using a second recognition device,
   wherein during said calculating the common attribute, the common attribute is calculated through performing a bit-wise OR operation among the CIDs of the offloaded connections, and
   wherein said recognizing to determine whether the packet is a non-offloaded packet comprises
      performing a bit-wise NOT operation on the common attribute to provide an inverted common attribute,
      performing a bit-wise AND a operation on the CID of the packet and the inverted common attribute, so as to calculate a negative identification code, and
      inspecting the negative identification code to determine whether the negative identification code has at least one bit that is not equal to logic 0, wherein if the negative identification code has at least one bit that is not equal to logic 0, the packet is a non-offloaded packet.

2. The method as claimed in claim 1, further comprising a validation inspection to inspect validation of the packet before said calculating the common attribute.

3. The method as claimed in claim 2, further comprising a protocol recognition to determine whether a protocol of the packet is the same as a protocol of a protocol offload processing system, after said validation inspection.

4. A method for recognizing offloaded packets, comprising:
   calculating a common attribute of connection identifications (CIDs) among a plurality of offloaded connections using a common attribute calculating device;
   recognizing the CID of a packet to determine whether the CID has the common attribute, so as to determine whether the packet is a non-offloaded packet, using a first recognition device; and
   recognizing whether the packet is an offloaded packet if the CID of the packet has the common attribute, using a second recognition device, wherein during said calculating the common attribute, the common attribute is calculated through performing a bit-wise AND operation among the CIDs of the offloaded connections, and
   wherein said recognizing to determine whether the packet is a non-offloaded packet comprises
      performing a bit-wise NOT operation on the common attribute to provide an inverted common attribute,
      performing a bit-wise OR operation on the CID of the packet and the inverted common attribute, so as to calculate a negative identification code, performing a bit-wise NOT operation on the negative identification code to provide an inverted negative identification code, and inspecting the inverted negative identification code to determine whether the inverted negative identification code has at least one bit that is not logic 0, wherein if the inverted negative identification code has at least one bit that is not logic 0, the packet is a non-offloaded packet.

5. A system for recognizing offloaded packets, the system used in a protocol offload processing system with an embedded processor, the system comprising:

a common attribute calculating device, for calculating a common attribute of the CIDs among a plurality of offloaded connections;

a non-offloaded packet recognition device, for recognizing whether a CID of a packet has the common attribute, so as to determine whether the packet is a non-offloaded packet; and an offloaded packet recognition device, for recognizing whether the packet is an offloaded packet if the CID of the packet has the common attribute, wherein in the common attribute calculating device, the common attribute is calculated through performing a bit-wise OR operation among the CIDs of the offloaded connections, and wherein the non-offloaded packet recognition device comprises an invader for performing a bit-wise NOT operation on the common attribute to provide an inverted common attribute, a bit wise AND operator for performing a bit-wise AND operation on the CID of the packet and the inverted common attribute, so as to calculate a negative identification code, and a discriminator, for inspecting whether the negative identification code has at least one bit that is not logic 0, wherein if the negative identification code has at least one bit that is not logic 0, the packet is a non-offloaded packet.

6. The system as claimed in claim 5, further comprising a validation inspection device for inspecting validation of the packet.

7. The system as claimed in claim 6, further comprising a protocol recognition device for determining whether a protocol of the packet is the same as a protocol of the protocol offload processing system.

8. A system for recognizing offloaded packets, the system used in a protocol offload processing system with an embedded processor, the system comprising:

a common attribute calculating device, for calculating a common attribute of the CIDs among a plurality of offloaded connections;

a non-offloaded packet recognition device, for recognizing whether a CID of a packet has the common attribute, so as to determine whether the packet is a non-offloaded packet; and an offloaded packet recognition device, for recognizing whether the packet is an offloaded packet if the CID of the packet has the common attribute, wherein in the common attribute calculating device, the common attribute is calculated through performing a bit-wise AND operation among the CIDs of the offloaded connections, and wherein the non-offloaded packet recognition device comprises an inverter for performing a bit-wise NOT operation on the common attribute to provide an inverted common attribute, a bit wise OR operator for performing a bit-wise OR operation on the CID of the packet and the inverted common attribute, so as to calculate a negative identification code, and a discriminator, for inspecting the negative identification code to determine whether the negative identification code has at least one bit that is not logic 1, wherein if the negative identification code has at least one bit that is not logic 1, the packet is a non-offloaded packet.

* * * * *